(12) United States Patent
Kohl et al.

(10) Patent No.: US 6,554,359 B2
(45) Date of Patent: Apr. 29, 2003

(54) SPRUNG VEHICLE SEAT

(75) Inventors: Josef Kohl, Hirschau (DE); Hermann Meiller, Wernberg-Köblitz (DE)

(73) Assignee: Grammer AG, Amberg (DE)

( * ) Notice: Subject to any disclaimer, the term of this patent is extended or adjusted under 35 U.S.C. 154(b) by 3 days.

(21) Appl. No.: 09/909,055

(22) Filed: Jul. 19, 2001

(65) Prior Publication Data
US 2002/0024244 A1 Feb. 28, 2002

(30) Foreign Application Priority Data
Aug. 18, 2000 (DE) ......... 100 40 535

(51) Int. Cl.[7] ............. A47C 1/02
(52) U.S. Cl. ........ 297/338; 297/344.15; 248/421; 248/431
(58) Field of Search ........ 297/344.15, 338, 297/345, 304; 248/420, 157, 421, 431

(56) References Cited

U.S. PATENT DOCUMENTS

| | | | | |
|---|---|---|---|---|
| 3,984,078 A | * | 10/1976 | Sturhan | 248/588 |
| 4,148,518 A | * | 4/1979 | Vilbeuf | 296/65.02 |
| 4,461,444 A | * | 7/1984 | Grassl et al. | 248/550 |
| 4,684,100 A | * | 8/1987 | Grassl | 248/550 |
| 4,822,094 A | * | 4/1989 | Oldfather et al. | 296/65.02 |
| 4,943,037 A | * | 7/1990 | Brodersen et al. | 267/131 |
| 5,005,894 A | * | 4/1991 | Nagata | 296/68.1 |
| 5,211,369 A | * | 5/1993 | Hoerner | 248/588 |
| 5,222,709 A | * | 6/1993 | Culley et al. | 248/421 |
| 5,251,864 A | * | 10/1993 | Itou | 248/588 |
| 5,676,424 A | * | 10/1997 | Winkelhake | 297/337 |
| 5,927,679 A | * | 7/1999 | Hill | 248/588 |

FOREIGN PATENT DOCUMENTS

| | | | | |
|---|---|---|---|---|
| GB | 2129678 A | * | 5/1984 | B60N/01/00 |
| JP | 57186533 A | * | 11/1982 | B60N/01/06 |

* cited by examiner

*Primary Examiner*—Peter M. Cuomo
*Assistant Examiner*—Stephanie Harris
(74) *Attorney, Agent, or Firm*—Elliot M. Olstein; Raymond J. Lillie

(57) ABSTRACT

A sprung vehicle seat has a base member and a top member, and a scissor support assembly operatively disposed therebetween. The scissor support assembly comprises first and second pivotably interconnected scissor levers. Secured to the first scissor levers is a sliding guide in the form of a plate member which is oriented in the longitudinal direction of the seat. A spring member bears against the sliding guide and the top member and is displaceable in the longitudinal direction of the seat for the purposes of weight adjustment of the seat.

7 Claims, 2 Drawing Sheets

SPRUNG VEHICLE SEAT

FIELD OF THE INVENTION

The invention generally concerns a seat and more particularly a sprung vehicle seat.

BACKGROUND OF THE INVENTION

Various kinds of sprung vehicle seat are already in use in different types of vehicles. One form of such a seat comprises a base surface member for mounting to the vehicle structure and a top surface member intended for example to carry a seat squab. The seat includes a spring member for providing the springing effect, while operatively disposed between the base member and the top member is a scissor support assembly comprising first and second lateral scissor levers or arms. The scissor levers are each fixed by one end thereof while their second end remote therefrom is movable to permit a scissor action on the part of the scissor support assembly. The scissor levers are pivotably connected together by means of a suitable spindle or shaft. Mounted to the first scissor levers is a sliding guide which is oriented in the longitudinal direction of the seat and against which bears the spring member which is adjustable for weight adjustment of the seat, in the longitudinal direction of the seat. Reference may be made to DE 30 42 604 C2 to find a seat design of that nature.

Due to the actual structure involved however that known vehicle seat cannot be less than a given minimum heightwise dimension, that is to say, in regard to the heightwise setting of the top member in relation to the base member.

Reference may also be made to U.S. Pat. No. 5,871,198 for a vehicle seat of similar sprung nature. That vehicle seat however involves a multiplicity of individual components, and the assembly thereof represents a not inconsiderable expenditure in terms of time and labor.

SUMMARY OF THE INVENTION

An object of the present invention is to provide a sprung vehicle seat which is of a simple design configuration and simple to manufacture and which is such that the spacing between the base and top members in the condition of maximum loading on the seat can be extremely small.

A further object of the present invention is to provide a sprung vehicle seat which is of a rational structure with a small number of components with little susceptibility to wear and which can also be of a very compact structure in the heightwise direction thereof.

Still another object of the present invention is to provide a sprung vehicle seat which affords easy weight adjustment for the seat occupant.

In accordance with the principles of the present invention the foregoing and other objects are attained by a sprung vehicle seat comprising a base surface member, a top surface member, and a scissor support assembly operatively disposed between the base member and the top member and having first and second lateral scissor levers each having a first end which is fixed and a second end which is remote from the first end and which is movable. The scissor levers are pivotably connected together by means of a pivot spindle or shaft. Fixed to the first scissor levers and oriented in the longitudinal direction of the seat is a sliding guide against which a spring member bears. The spring member is adjustable for weight adjustment of the vehicle seat, in the longitudinal direction of the seat. The sliding guide is in the form of a plate member which in the non-loaded condition of the vehicle seat is oriented at least approximately parallel to the top member. Arranged on the plate member slidably in the longitudinal direction of the seat is a first slide member for fixing the first end portion of the spring member, being the lower end thereof. Arranged at the underside of the top member slidably in the longitudinal direction of the seat is a second slide member for fixing the second end portion of the spring member, being the upper end thereof. The first slide member and the second slide member are connected together by means of the spring member and are thus displaceable simultaneously in the longitudinal direction of the seat for weight adjustment of the vehicle seat.

As will be apparent from the description hereinafter of a preferred embodiment of the invention, the fact that the sliding guide is in the form of a plate member which for example may involve a sheet metal member which is connected by welding to the two lateral first scissor levers means that it is possible for the vehicle seat overall to be of a small structural height, in comparison with a seat having a sliding guide which is oriented perpendicularly as is used in above-mentioned DE 30 42 604 C2 or in comparison with wedge surfaces which are also oriented perpendicularly or inclinedly upwardly and downwardly as are used in above-mentioned U.S. Pat. No. 5,871,198. In addition, the plate member which constitutes the sliding guide is comparatively easy and thus inexpensive to produce. The same applies in regard to the first and second slide members between which the spring member is disposed. The spring member can be arranged loosely between the two slide members. Simultaneous displacement of the first and second slide members with the spring member arranged therebetween, for weight adjustment of the vehicle seat, can be effected for example by means of a spindle drive or by means of a displacement arrangement as is described in German patent application No 100 39 501.5.

In a preferred feature of the vehicle seat according to the invention the spring means can be formed by a conical spiral spring which increases in width from the first end portion which is at the lower end to the second end portion which is at the upper end, wherein the first slide member has a holding projection adapted to the first end portion of the spiral spring and the second slide member has a collar adapted to the second end portion of the spiral spring. Such a design configuration affords the advantage that it ensures a reliable operative connection between the first and second slide members by means of the spiral spring, in spite of being loosely combined with the two slide members, while in addition ensuring optimum displaceability of the spring between the plate member forming the sliding guide and the top member of the vehicle seat. A further advantage of such a vehicle seat design configuration is that the structural height thereof, that is to say the spacing between the base member and the top member of the vehicle seat, can be very small when the spiral spring is in the 'coil-bound' condition, that is to say when the coils of the spiral spring are in a condition of bearing against each other and the spring is thus solid.

In a further preferred feature of the invention the spring means of the vehicle seat can for example also comprise a block of a suitable plastic material, which enjoys suitable spring properties.

In a further preferred feature of the vehicle seat according to the invention the plate member forming the sliding guide has a main portion extending forwardly in the longitudinal direction of the seat from the scissor support assembly pivot in a direction towards the fixed end of the two lateral first scissor levers, and a secondary portion extending rearwardly in the opposite direction to the first-mentioned direction. The scissor support assembly pivot is at a central region of the vehicle seat, that is to say, of the seat cushion or squab which is disposed on the top member of the vehicle seat. That central region is also correspondingly loaded by the respective occupant of the seat. If the spring means is displaced in the longitudinal direction of the seat into the proximity of the scissor support assembly pivot, that denotes a weight setting of the seat for a seat occupant of heavier weight. If on the other hand the spring means is displaced forwardly away from the scissor support assembly pivot, that denotes a weight setting for an occupant of lighter weight. That can be explained by virtue of the turning moment of the spring force of the spring means and the associated lever arm between the spring means and the fixed ends of the two lateral first scissor levers, which compensates for the turning moment which is determined by the weight of the user and the lever arm of that weight in relation to the fixed end of the first scissor levers.

In another preferred feature of the invention the main portion and/or the secondary portion of the plate member forming the sliding guide has an abutment which, when the vehicle seat is in the lowest condition thereof in which the spring is compressed, bears against the base member of the vehicle seat. That provides for precisely and definedly establishing the lowermost position of the vehicle seat in which the spring is fully compressed, when the seat therefore involves the minimum structural height thereof.

As the spring means is provided between the first and second slide members of the vehicle seat, in such a way that the spring means presses with a given, low level of mechanical bias against the plate member forming the sliding guide and the top member of the vehicle seat, a certain amount of friction which is proportional to that biasing force is inevitable upon longitudinal displacement of the spring means for weight adjustment of the seat. In order to remove that frictional effect, a preferred feature of the invention can provide that a flexible non-stretchable member is tensioned between the lower and upper end portions of the spring member, with a pre-loading spring member operatively disposed between the base member and the top member of the seat. The flexible non-stretchable member between the lower and upper end portions of the spring means or between the two slide members may be a non-stretchable band or cable which is disposed between the end portions of the spring means or between the slide members in such a way that the spring means bears precisely between the plate member and the top member of the vehicle seat without however pressing against the plate member and the top member. That eliminates friction upon longitudinal displacement of the spring means between the plate member and the top member of the seat. A further advantage of such a design configuration is that it makes it easier to assemble the spring means in the seat. The pre-loading spring member of the seat affords in that respect the advantage that it is capable of compensating at least for the weight of the vehicle seat, that is to say, all the seat components above the base member of the seat. Preferably however the seat uses a pre-loading spring member which is also suitable for compensating for the weight of a light seat occupant. Then the spring member which is operatively disposed between the plate member and the top member of the vehicle seat and which is displaceable in the longitudinal direction of the seat for weight adjustment thereof can advantageously be so dimensioned that it only has to be capable of compensating for or setting the weight difference between a light occupant and a heavy occupant.

Further objects, features and advantages of the invention will be apparent from the description hereinafter of two embodiments of a vehicle seat according to the invention.

DESCRIPTION OF THE PREFERRED EMBODIMENTS

Figure 1:
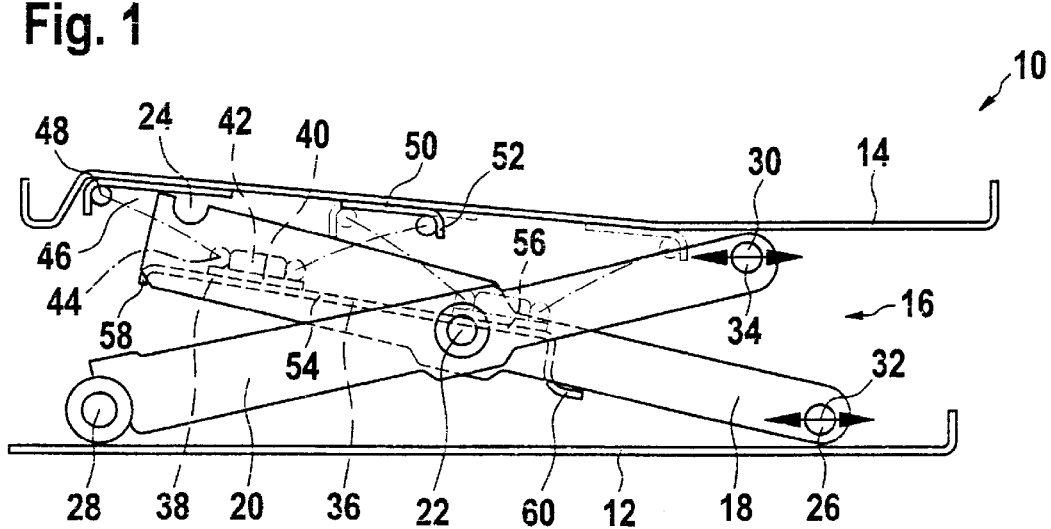
FIG. 1 is a side view of a first embodiment of the vehicle seat and the supporting structure thereof, with the top member spaced relatively far from the base member of the seat.
Figure 2:
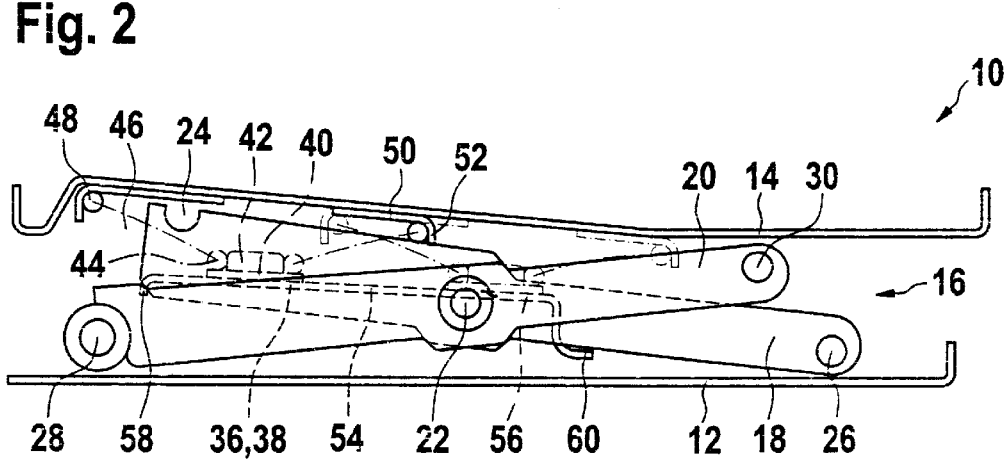
FIG. 2 is a view corresponding to FIG. 1 of the vehicle seat shown therein in a medium pivotal position, with the top member at a medium spacing from the base member.
Figure 3:
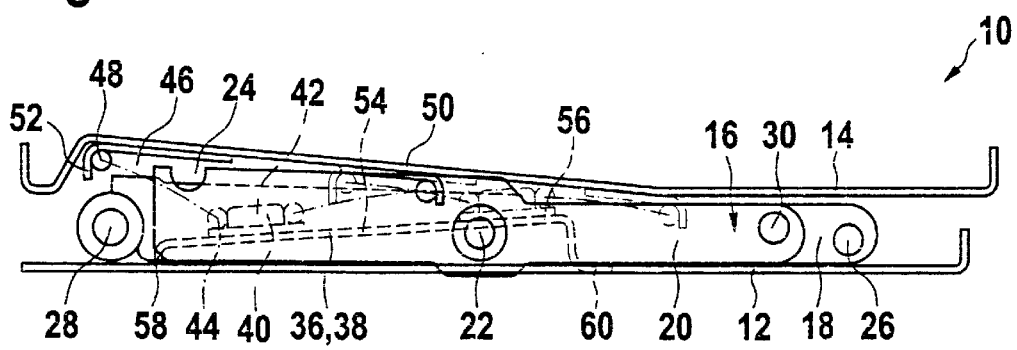
FIG. 3 is a view corresponding to FIGS. 1 and 2 of the vehicle seat shown therein in its maximally compressed lowermost condition.

Referring firstly to FIGS. 1 through 3, shown therein is an embodiment of a vehicle seat 10 according to the invention and more specifically the support structure thereof comprising a base surface member 12 which in use for example can be secured to a vehicle body structure and a top surface member 14 on which for example a seat cushion or squab can be supported. The base and top members 12 and 14 are connected together by means of a scissor support assembly generally indicated at 16. The scissor support assembly 16 has two lateral first scissor arms or levers 18 and two lateral second scissor arms or levers 20. The first and second scissor levers 18 and 20 are pivotably connected together by means of a pivot 22 such as a spindle or shaft.

Each of the two lateral first scissor levers 18 has a first end 24 and a second end 26. Each of the two second scissor levers 20 has a first end 28 and a second end 30. The first end 24 of each of the first lateral scissor levers 18 is mounted pivotably at a stationary location to the top member 14. The first end 28 of each of the two lateral second scissor levers 20 is mounted pivotably at a stationary location to the top member 12. The second end 26 of each of the two first scissor levers 18 is linearly movably guided on the base member 12, such linearly guided mobility being indicated by the double-headed arrow 32 in FIG. 1. The second end 30 of the respective second lateral scissor lever 20 is linearly movably guided at the top member 14, such linearly guided mobility being correspondingly indicated by the double-headed arrow 34 in FIG. 1.

Fixed to the first scissor levers 18 is a sliding guide 36 which is formed by a plate member 38. The plate member 38 is oriented at least approximately parallel to the top member 14 of the vehicle seat 10 in the non-loaded condition of the vehicle seat, as is shown in FIG. 1.

A first slide member 40 is arranged on the plate member 38 slidably in the longitudinal direction of the seat, that is to say in the direction left to right and right to left in FIG. 1. The first slide member 40 is shown in solid lines in a forward position in the longitudinal direction of the seat and in broken lines in a rearwardly displaced position. The first slide member 40 is displaced on the plate member 38 by means of a suitable displacement device which is not shown herein.

The first slide member 40 is provided with a holding projection 42 which is adapted in respect of dimensions to a first end portion indicated at 44 of a spring member 46 which is diagrammatically indicated by dash-dotted lines and which is disposed or stressed between the plate member 38 and the top member 14 of the vehicle seat 10. The spring member 46 can thus be seen as being in the form of a conical spiral spring, with the first end portion 44 thereof being the lower end in FIG. 1. The second, upper end portion 48 of the spring member 46 is mounted to the top member 14 by means of a second slide member 50 which is operatively connected to the first slide member 40 by means of the spring member 46 which is slightly mechanically biased.

As mentioned above and as can be clearly seen from the dash-dotted line indicating the spring member 46 in FIG. 1, the spring member 46 in this embodiment can be in the form of a conical spiral spring which is of an enlarging configuration from its lower first end portion 44 to its upper second end portion 48. The second slide member 50 is provided with a downwardly projecting collar or flange as indicated at 52 in FIGS. 1 and 2, for definedly fixing the second end portion 48 of the spring member 46 to the second slide member 50.

The plate member 38 has a main portion 54 which extends forwardly in the longitudinal direction of the seat in relation to the scissor support assembly pivot 22, that is to say it extends in a direction towards the fixed first end 24 of the two lateral first scissor levers 18. The plate member 38 also has a secondary portion 56 which extends rearwardly in the opposite direction, that is to say away from the pivot 22, in the longitudinal direction of the seat. The main portion 54 of the plate member 38 is provided with a downwardly oriented abutment as indicated at 58 and the secondary portion 56 is provided with an also downwardly oriented abutment as indicated at 60. The abutment 58 and the abutment 60 can bear against the base member 12 when the vehicle seat is in the lowermost compressed condition as shown in FIG. 3.

It will be noted that the foregoing description has been primarily focused on FIG. 1, but it will be appreciated that the same details are respectively denoted by the same references in each of FIGS. 1 through 3 so that FIGS. 2 and 3 will not be further described in full detail for the avoidance of repetition. Suffice it to say that the first slide member 42 which is arranged on the plate member 38 slidably in the longitudinal direction of the seat for fixing the first lower end portion 44 of the spring member 46 and the second slide member 50 arranged at the underside of the top member 14 slidably in the longitudinal direction of the seat for fixing the second upper end portion 48 of the spring member 46 are operatively connected together by the spring member 46 and are thus displaceable simultaneously in the longitudinal direction of the seat for weight adjustment of the vehicle seat to suit the respective occupant.

Figure 4:
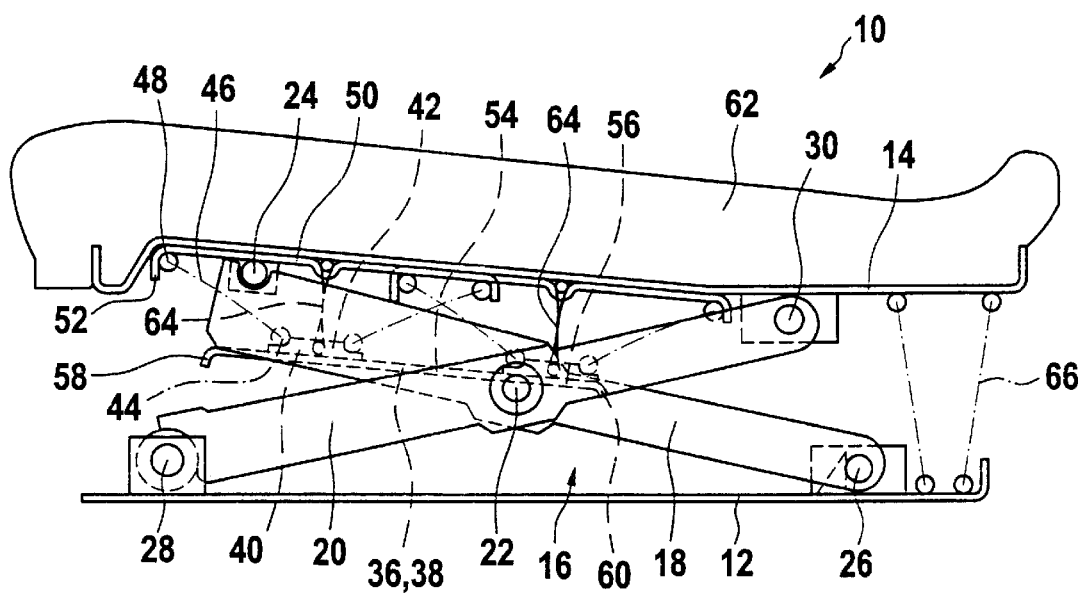
FIG. 4 is a diagrammatic side view of a second embodiment of the vehicle seat in the upwardly extended condition thereof.
Figure 5:
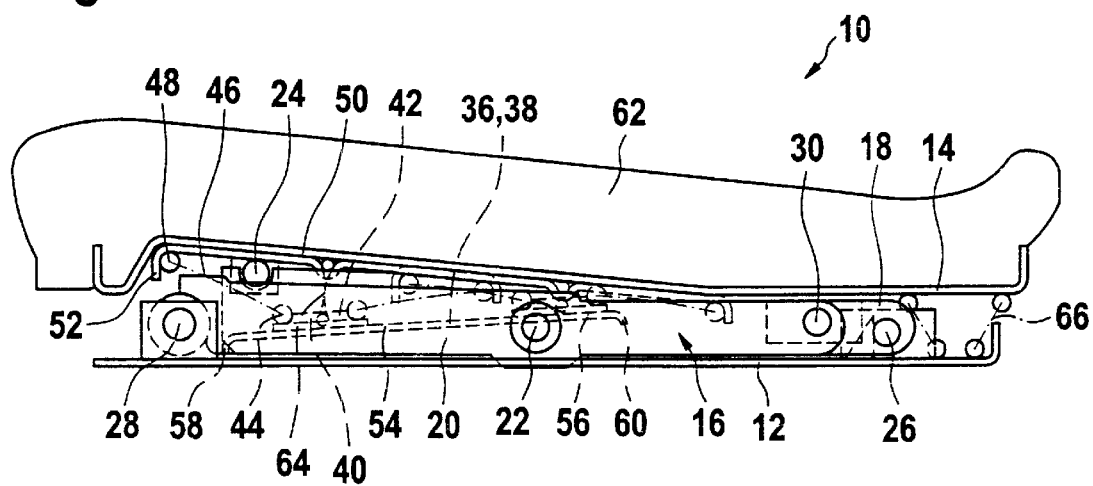
FIG. 5 is a view corresponding to FIG. 4 of the vehicle seat shown therein in its compressed lowermost condition.

Reference will now be made to FIGS. 4 and 5 showing a second embodiment of the vehicle seat generally indicated at 10 and more particularly the support structure thereof, reference numeral 62 denoting a seat cushion or squab which is disposed on the top member 14 of the seat. It will be appreciated that the vehicle seat will generally have a backrest but that this is not shown in the drawing for the sake of enhanced simplicity thereof.

Structurally or functionally identical features are also denoted in FIGS. 4 and 5 by the same references as those used in FIGS. 1 through 3, so that all those specific features of the structure shown in FIGS. 4 and 5 will not be described in detail once again in relation to FIGS. 4 and 5, for the avoidance of undue repetition.

A distinction between the embodiment of FIGS. 1 through 3 and that of FIGS. 4 and 5 however is that, in the vehicle seat 10 as shown in FIGS. 4 and 5, provided between the lower first end portion 44 of the spring member 46 and the upper second end portion 48 of the spring member 46, or between the first slide member 40 and the second slide member 50, is a flexible non-stretchable member which is diagrammatically indicated at 64, so arranged that the spring member 46 presses against the plate member 30 and against the top member 14 of the vehicle seat 10 either only with a negligibly low force component or none at all, so that the frictional force involved upon displacement of the spring member 46 in the longitudinal direction of the seat is either totally eliminated or is at least negligibly small.

FIGS. 4 and 5 show the spring member 46, the slide members 40 and 50 and the flexible non-stretchable element 64 in two mutually different longitudinal positions.

In order to provide compensation for the weight of the upper part of the structure of the vehicle seat 10, that is to say the structure above the base member 12, and possibly to compensate for the weight of a lightweight occupant of the seat, disposed between the base member 12 and the top member 14 of the vehicle seat is a pre-loading spring member which is indicated in dash-dotted lines at 66 and which is illustrated in the form of a conical spiral spring, like the spring member 46 between the plate member 38 and the top member 14. The spring member 66 alternatively could be formed by a block of plastic material which enjoys suitable spring properties.

It will be seen from a comparison between FIGS. 1 and 3, or between FIGS. 4 and 5, that the fact that the sliding guide of the vehicle seat according to the invention is in the form of a plate member connected by welding to the two lateral first scissor levers 18 means that the seat can be of a small structural height, in particular in its fully down position as shown in FIG. 3 and FIG. 5 respectively. This reduction in the overall height of the seat in its lowest position is enhanced by the fact that the plate member is disposed horizontally. A further reduction in the total height of the seat can be achieved by virtue of the fact that components of its supporting structure can be integrated into the seat cushion or squab of the seat.

It will be noted that simultaneous displacement of the first and second slide members 40 and 50 with the spring member 46 therebetween for weight adjustment of the vehicle seat can be effected by any suitable form of actuator such as a spindle drive or a suitable displacement device.

It will be appreciated that the above-described embodiments of the invention have been set forth solely by way of example and illustration of the principles of the invention and that various modifications and alterations may be made therein without thereby departing from the spirit and scope of the invention.

What is claimed is:

1. In a sprung vehicle seat comprising
   a base member,
   a top member,
   a scissor support assembly operatively disposed between the base member and the top member and comprising first and second lateral scissor levers each having a first fixed end and a second movable end remote from the first end,
   a scissor support assembly pivot means pivotably movably connecting the scissor levers together,
   a sliding guide mounted to the first scissor levers and oriented in the longitudinal direction of the seat, and a spring means having first and second ends and co-operable at the first end with the sliding guide displaceably in the longitudinal direction of the seat on the sliding guide for weight adjustment of the vehicle seat, the improvement that the sliding guide is in the form of a plate member which in the non-loaded condition of the vehicle seat is oriented at least approximately parallel to the top member, a first slide member carried on the plate member slidably in the longitudinal direction of the seat for fixing the first end portion of the spring means, and a second slide member at the underside of the top member slidably in the longitudinal direction of the seat for fixing the second end portion of the spring means, wherein the first and second slide members are connected together by the spring means and are thus displaceable simultaneously in the longitudinal direction of the seat for weight adjustment of the vehicle seat.

2. A vehicle seat as set forth in claim 1 wherein the spring means is formed by a conical spiral spring which increases in width from the first end portion to the second end portion thereof, and wherein the first slide member has a holding projection adapted to hold the first end portion of the conical spiral spring and the second slide member has a collar adapted to hold the second end portion of the conical spiral spring.

3. A vehicle seat as set forth in claim 1 wherein said plate member has a main portion extending in the longitudinal direction of the seat forwardly in relation to the scissor support assembly pivot means towards the fixed end of the two lateral first scissor levers, and a secondary portion extending rearwardly in the opposite direction away from said pivot means.

4. A vehicle seat as set forth in claim 3 wherein at least one of said main portion and said secondary portion of the plate member has an abutment operable to bear against the base member when the vehicle seat is in its lowest condition.

5. A vehicle seat as set forth in claim 1 including a flexible non-stretchable member tensioned between said first end portion and said second end portion of said spring means.

6. A vehicle seat as set forth in claim 1 including a pre-loading spring member operatively disposed between said base member and said top member.

7. A sprung vehicle seat comprising a base member, a top member, a scissor support assembly operatively disposed between the base member and the top member and comprising first and second lateral scissor levers each having a first fixed end and a second movable end remote from the first end, a scissor support assembly pivot means pivotably movably connecting the scissor levers together, a sliding guide in the form of a plate member mounted to the first scissor levers and oriented in the longitudinal direction of the seat, the plate member in the non-loaded condition of the vehicle seat being at least approximately parallel to the top member, a first slide member carried slidably on the plate member in the longitudinal direction of the seat, a second slide member at the underside of the top member slidably in the longitudinal direction of the seat, and a spring means having first and second end portions, the first end portion being fixed to the first slide member and the second end portion being fixed to the second slide member, the arrangement being such that the first and second slide members are connected together by the spring means and are thus displaceable simultaneously in the longitudinal direction of the seat for weight adjustment of the vehicle seat.

\* \* \* \* \*